(12) United States Patent
Nakamoto

(10) Patent No.: US 7,725,033 B2
(45) Date of Patent: May 25, 2010

(54) OPTICAL WAVELENGTH CONTROLLING METHOD AND A SYSTEM THEREOF

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1160 days.

(21) Appl. No.: 11/319,231

(22) Filed: Dec. 28, 2005

(65) Prior Publication Data
US 2007/0077066 A1 Apr. 5, 2007

(30) Foreign Application Priority Data
Sep. 30, 2005 (JP) .............................. 2005-287534

(51) Int. Cl.
- H04B 10/00 (2006.01)
- H04B 10/08 (2006.01)
- H04B 10/04 (2006.01)
- H04J 14/02 (2006.01)

(52) U.S. Cl. .............................. 398/95; 398/94; 398/33; 398/196; 398/197; 398/162; 398/159

(58) Field of Classification Search .................... 398/33, 398/38, 94, 95, 159, 162, 192, 193, 196, 398/197
See application file for complete search history.

(56) References Cited

U.S. PATENT DOCUMENTS

| | | | |
|---|---|---|---|
| 5,225,922 A * | 7/1993 | Chraplyvy et al. ............. | 398/94 |
| 5,717,510 A | 2/1998 | Ishikawa et al. | |
| 5,754,322 A | 5/1998 | Ishikawa et al. | |
| 5,760,937 A | 6/1998 | Ishikawa et al. | |
| 5,815,294 A | 9/1998 | Ishikawa et al. | |
| 5,870,213 A | 2/1999 | Ishikawa et al. | |
| 5,896,217 A | 4/1999 | Ishikawa et al. | |
| 5,909,297 A | 6/1999 | Ishikawa et al. | |
| 5,923,450 A * | 7/1999 | Dugan et al. ................... | 398/95 |
| 5,991,477 A | 11/1999 | Ishikawa et al. | |
| 6,031,644 A | 2/2000 | Utsumi | |
| 7,079,772 B2 * | 7/2006 | Graves et al. ................. | 398/95 |

(Continued)

FOREIGN PATENT DOCUMENTS

JP 8-321805 12/1996

(Continued)

OTHER PUBLICATIONS

Tatsuya Kimoto, et al., "Highly Reliable 40-mW, 25-GHz x 20-ch Thermally Tunable DFB Laser Module Integrating Wavelength Monitor", Jul. 2003 (and an English Abstract of which are enclosed herewith, discloses a background art of the present invention).

(Continued)

Primary Examiner—Dalzid Singh

(57) ABSTRACT

An optical wavelength controlling method and a system thereof for an optical wavelength division multiplexing transmission system, wherein a plurality of wavelengths of channels are multiplexed and transmitted by an optical transmitting unit, and the multiplexed wavelengths are divided into the wavelengths of the channels by an optical receiving unit, are disclosed.

The optical wavelength controlling method includes:

a step of reducing optical power of the wavelength of a target channel, and transmitting the wavelengths;

a step of evaluating channel crosstalk based on a code error rate of a channel adjacent to the target channel, and detecting a shift of the wavelength of the target channel; and a step of compensating for the shift of the wavelength of the target channel.

7 Claims, 10 Drawing Sheets

U.S. PATENT DOCUMENTS

2002/0048062 A1 4/2002 Sakamoto et al.
2003/0223751 A1* 12/2003 Shimizu et al. ............... 398/79
2004/0037569 A1 2/2004 Kamalov et al.

FOREIGN PATENT DOCUMENTS

JP 10-163971 6/1998
JP 2000-59308 2/2000

OTHER PUBLICATIONS

A. Richter et al., "Optical Peerformance Monitoring in Transparent and Configurable DWDM Networks", IEE Proceedings: Optoelectronics Institution of Electrical Engineers, Stevenage, GB, vol. 149, No. 1, Feb. 18, 2002, pp. 1-5.

European Search Report mailed Jan. 12, 2010 in corresponding European Patent Application 05113040.9.

* cited by examiner

FIG.6

| CHANNEL, TRANSMISSION POWER OF WHICH IS REDUCED BY 1 DB | 1 | | 2 | | 3 | | 4 | | 5 | | 6 | | 7 | |
|---|---|---|---|---|---|---|---|---|---|---|---|---|---|---|
| CHANNELS, Q VALUES OF WHICH ARE MEASURED | 2 | | 1 | 3 | 2 | 4 | 3 | 5 | 4 | 6 | 5 | 7 | 6 | 8 |
| AMOUNT OF CROSSTALK DEGRADATION | $\Delta Q_{1,2}$ | $\Delta Q_{2,1}$ | $\Delta Q_{2,3}$ | $\Delta Q_{3,2}$ | $\Delta Q_{3,4}$ | $\Delta Q_{4,3}$ | $\Delta Q_{4,5}$ | $\Delta Q_{5,4}$ | $\Delta Q_{5,6}$ | $\Delta Q_{6,5}$ | $\Delta Q_{6,7}$ | $\Delta Q_{7,6}$ | $\Delta Q_{7,8}$ | |

OPTICAL WAVELENGTH CONTROLLING METHOD AND A SYSTEM THEREOF

BACKGROUND OF THE INVENTION

1. Field of the Invention

The present invention generally relates to an optical wavelength controlling method and the system thereof; and especially relates to an optical wavelength controlling method of an optical wavelength division multiplexing (WDM) transmission system, and a system thereof.

2. Description of the Related Art

FIG. 1 is a block diagram showing an example of an optical wavelength division multiplexing (WDM) transmission system. Data to be transmitted are provided in two or more streams to corresponding transmission data processing units $11_1$ through $11_n$ of an optical transmitting unit 10 from an external source. The transmission data processing units $11_1$ through $11_n$ carry out processes of format conversion, rate conversion, etc. The processed transmission data, which are electrical signals, are converted into corresponding optical signals by corresponding electric-to-optical conversion units $12_1$ through $12_n$. Then, the optical signals are amplified by corresponding optical amplifiers $13_1$ through $13_n$, and distribution of the optical signals is compensated for by corresponding distribution compensating units $14_1$ through $14_n$. Optical intensities of the optical signals are set to the same level by corresponding variable attenuators $15_1$ through $15_n$. An adder 16 multiplexes the level-adjusted optical signals, making a WDM signal, and the WDM signal is sent out to an optical transmission line 17. One or more optical repeaters 18 are provided on the optical transmission line 17 as required.

The WDM signal arrives at a divider 21 of an optical receiving unit 20, and is divided into optical signals of two or more wavelengths by the divider 21. Then, the optical signals are amplified by corresponding optical amplifiers $22_1$ through $22_n$. Intensities of the optical signals are made equal to each other by corresponding variable attenuators $23_1$ through $23_n$. Distribution of the level-adjusted optical signals is compensated for by corresponding distribution compensating units $24_1$ through $24_n$, and the optical signals are converted into electric signals by corresponding optical-to-electrical conversion units $25_1$ through $25_n$. A format conversion, rate conversion, etc., of the electric signals are processed by corresponding received data processing units $26_1$ through $26_n$, and the processed electric signals are output.

Optical wavelength division multiplexing (WDM) transmission systems are required to be capable of transmitting an increasing amount of information. The requirement can be met by expanding the signal wavelength band and improving use efficiency of the wavelength band. In order to improve the use efficiency of the wavelength band, development of a modulation/demodulation method with a narrow signal spectrum spread, and studies into systems with narrow channel spacing (wavelength interval) are being undertaken.

Here, in a system with narrow channel spacing, degradation of the transmission quality due to crosstalk from an adjacent channel tends to occur. Further, since the cycle of a pass band of an add/drop device becomes shorter when the channel spacing becomes narrower, the form of the pass band property of the add/drop device also becomes less. For example, a 3 dB width of the pass band property becomes smaller, which causes the add/drop device to reduce the spectrum of an optical signal, and the optical signal is distorted, degrading the transmission quality. For this reason, it is necessary to control the wavelength of each optical signal with high precision without the signal drifting from its assigned wavelength.

Patent References 1 and 2 disclose a technique of evaluating transmission quality (Q value, and an error rate) of an optical wavelength signal, and adjusting the optical wavelength so that the transmission quality is optimized.

Patent Reference 3 discloses a technique of evaluating the transmission quality (an error rate) of an optical wavelength signal, and adjusting the optical wavelength so that the transmission quality is optimized.

[Patent reference 1] JPA, 2000-59308
[Patent reference 2] JPA, 8-321805
[Patent reference 3] JPA, 10-163971
[Non-Patent Reference 1] Furukawa Electric Jiho, July, Heisei 15, "Highly Reliable 40-mW, 25-GHz×20-ch Thermally Tunable DFB Laser Module Integrating Wavelength Monitor" by Tatsuya Kimoto, Tatsushi Shinagawa, Toshikazu Mukaihara, Hideyuki Nasu, Shuichi Tamura, Takehiko Numura, and Akihiko Kasukawa, July 2003.

DESCRIPTION OF THE INVENTION

[Problem(s) to Be Solved by the Invention]

Conventionally, in order to precisely control the wavelength, a wavelength locker is often used (for example, see Non-Patent Reference 1). However, the wavelength locker is capable of providing precision of about ±20 pm, including a control circuit error, which precision is insufficient for high-density WDM transmission systems.

SUMMARY OF THE INVENTION

The present invention is made in view of the problems described above, and provides an optical wavelength controlling method, whereby each wavelength of two or more channels to be multiplexed can be set up and controlled with high precision, and a system that employs the method.

A preferred embodiment of the present invention provides an optical wavelength controlling method and a system thereof that substantially obviate one or more of the problems caused by the limitations and disadvantages of the related art.

Features of the present invention are set forth in the description that follows, and in part will become apparent from the description and the accompanying drawings, or may be learned by practice of the invention according to the teachings provided in the description. Problem solutions provided by the present invention will be realized and attained by an optical wavelength controlling method, and a system thereof particularly pointed out in the specification in such full, clear, concise, and exact terms as to enable a person having ordinary skill in the art to practice the invention.

To achieve these solutions and in accordance with the purpose of the invention, as embodied and broadly described herein, an embodiment of the invention provides an optical wavelength controlling method and a system thereof as follows.

[Means for Solving the Problem]

An aspect of the present invention provides an optical wavelength controlling method of an optical wavelength division multiplexing transmission system, wherein wavelengths of two or more channels are multiplexed and transmitted by an optical transmitting unit, and the wavelengths of the channels are divided by an optical receiving unit, the optical wavelength controlling method including a step of reducing optical power of the wavelength of one of the channels (target channel) out of the wavelengths of the channels, a step of evaluating channel crosstalk based on a code error rate of an adjacent channel that is adjacent to the target channel, the transmission power of the target channel being reduced; and detecting a shift (drift) of the wavelength of the target channel, and a step of compensating for the shift (drift) of the wavelength of the target channel. In this way, the wavelength of each of the channels to be multiplexed can be set up and controlled with high precision.

According to another aspect of the present invention, the optical wavelength controlling method includes a step of increasing the code error rate per unit time of each channel at the optical receiving unit.

Another aspect of the present invention provides an optical wavelength division multiplexing transmission system, wherein wavelengths of two or more channels are multiplexed and transmitted by an optical transmitting unit, and the wavelengths of the channels are divided by an optical receiving unit, the optical wavelength division multiplexing transmission system including an optical power reducing unit provided in the optical transmitting unit for reducing the optical power of the wavelength of one of the channels (target channel) out of the wavelengths of the channels, a wavelength shift (drift) detecting unit provided in the optical receiving unit for detecting the shift of the wavelength of the target channel by evaluating channel crosstalk based on an code error rate of an adjacent channel that is adjacent to the target channel, and a wavelength shift compensating unit provided in the optical transmitting unit for compensating for the shift of the wavelength of the target channel. In this way, the wavelength of each of the channels to be multiplexed can be set up and controlled with high precision.

Another aspect of the present invention provides the optical wavelength division multiplexing transmission system, including a code error rate increasing unit for increasing the code error rate of each channel per unit time at the optical receiving unit.

Another aspect of the present invention provides the optical wavelength division multiplexing transmission system, wherein the code error rate increasing unit increases the code error rate by changing a detecting threshold value, which value is for detecting an electric signal obtained by converting the optical signal of each wavelength of the channels divided by the optical receiving unit.

[Effect of the Invention]

According to an embodiment of the present invention, each wavelength of the channels to be multiplexed can be set up and controlled with high precision.

BRIEF DESCRIPTION OF THE DRAWINGS

FIG. 6 is a table showing an example of channels, transmitting power of which is reduced by 1 dB; channels, the Q value of which is measured; and an amount of quality degradation due to crosstalk according to the embodiment of the present invention;

DESCRIPTION OF THE PREFERRED EMBODIMENTS

In the following, embodiments of the present invention are described with reference to the accompanying drawings.

<Detection Method of Wavelength Shift>

Figure 1:
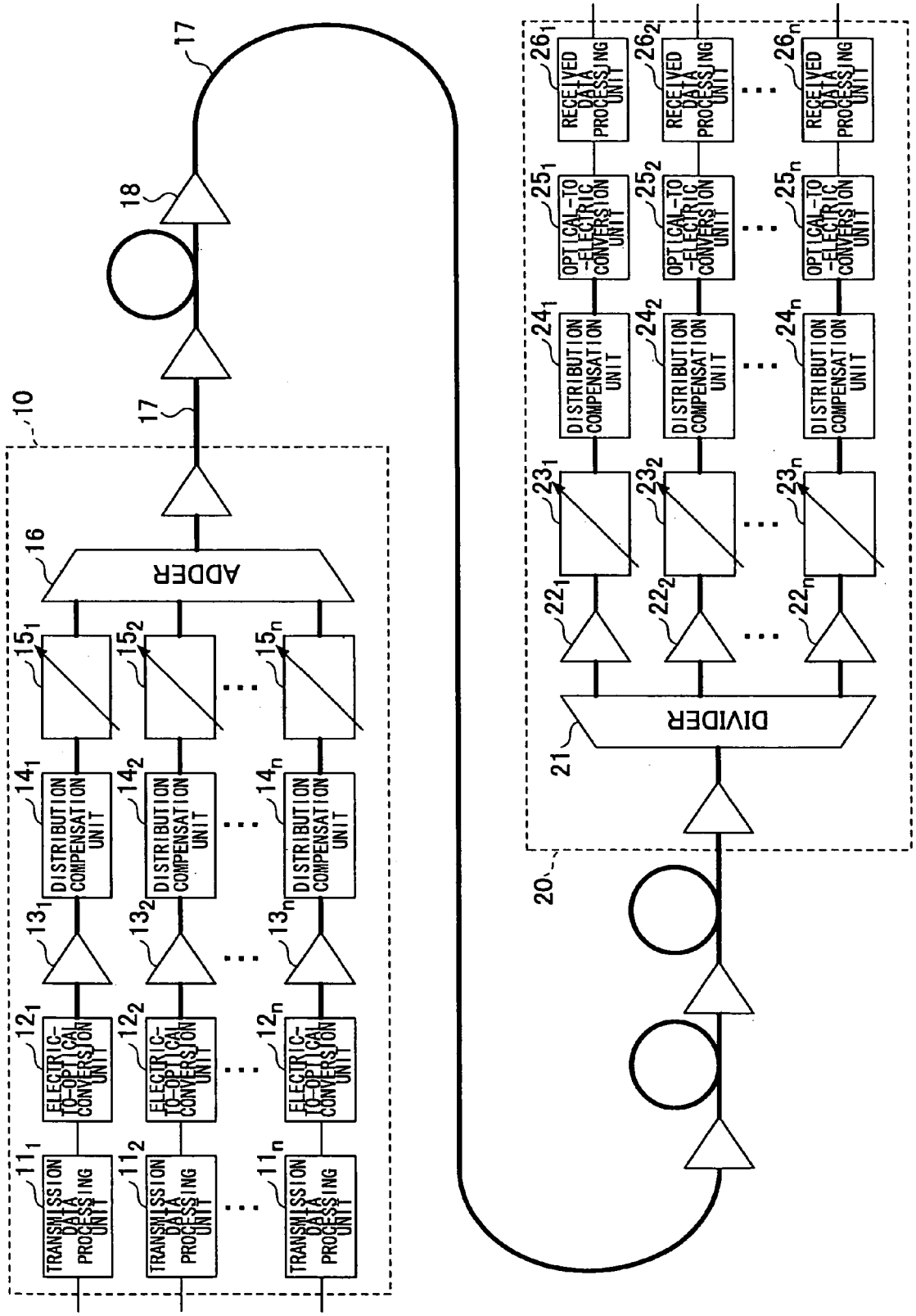
FIG. 1 is a block diagram showing an example of an optical wavelength division multiplexing (WDM) transmission system.
Figure 2:
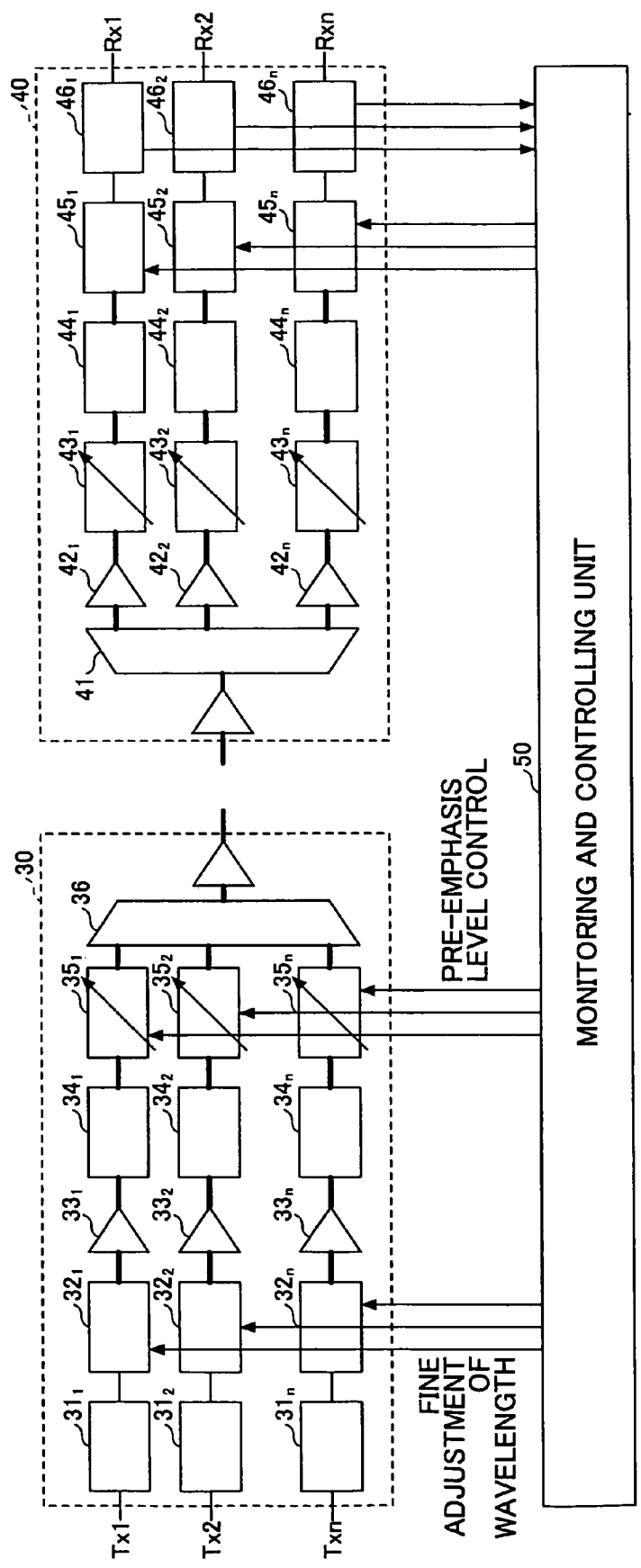
FIG. 2 is a block diagram showing an optical wavelength division multiplexing (WDM) transmission system according to an embodiment of the present invention.

FIG. 2 is a block diagram showing the system configuration of an optical wavelength division multiplexing (WDM) transmission system according to the embodiment of the present invention. The WDM transmission system includes an optical transmitting unit 30, an optical receiving unit 40, and a monitoring and controlling unit 50.

The optical transmitting unit 30 includes transmission data processing units $31_1$ through $31_n$ for converting format, rate, and the like, of transmission data in n channels that are provided to the optical transmitting unit 30 from an external source, electric-to-optical conversion units $32_1$ through $32_n$ for converting electric signals of the transmission data into optical signals, optical amplifiers $33_1$ through $33_n$ for amplifying the optical signals, distribution compensating units $34_1$ through $34_n$ for performing distribution compensation for the amplified optical signals, variable attenuators $35_1$ through $35_n$ for equalizing optical intensities of the optical signals, an adder 36 for multiplexing the optical signals into a WDM signal, and an optical transmission line 37 (not illustrated), by which the WDM signal is sent out.

One or more optical repeaters 38 (not illustrated) are provided on the optical transmission line 37 as required.

The optical receiving unit 40 includes a divider 41 for dividing the WDM signal into optical signals of n wavelengths, optical amplifiers $42_1$ through $42_n$ for amplifying the divided optical signals, variable attenuators $43_1$ through $43_n$ for equalizing the optical intensities of the amplified optical signals, distribution compensating units $44_1$ through $44_n$ for performing distribution compensation for the optical signals, optical-to-electrical conversion units $45_1$ through $45_n$ for converting the optical signals into electric signals, and received data processing units $46_1$ through $46_n$ for performing format conversion, rate conversion, etc., on the electric signals, and for outputting the processed electric signals.

The monitoring and controlling unit 50 acquires a Q value based on the number of error correction bits of code error rate correction circuits included in the received data processing units $46_1$ through $46_n$. When acquiring the Q value, the optical-to-electrical conversion units $45_1$ through $45_n$ change a detecting threshold such that the Q value is degraded. Then, the monitoring and controlling unit 50 performs a pre-emphasis level control operation, wherein an attenuation factor of the variable attenuators $35_1$ through $35_n$ is changed one by one; the transmitting power of the wavelength of each channel is reduced one by one; a wavelength that has a wavelength shift (drift) based on the Q value measured of each channel is detected; and finally the wavelength of an electric-to-optical conversion unit that causes the wavelength shift coming out of the electric-to-optical conversion units $32_1$ through $32_n$ is adjusted.

<Detection Method of Wavelength Shift>

Figure 3:
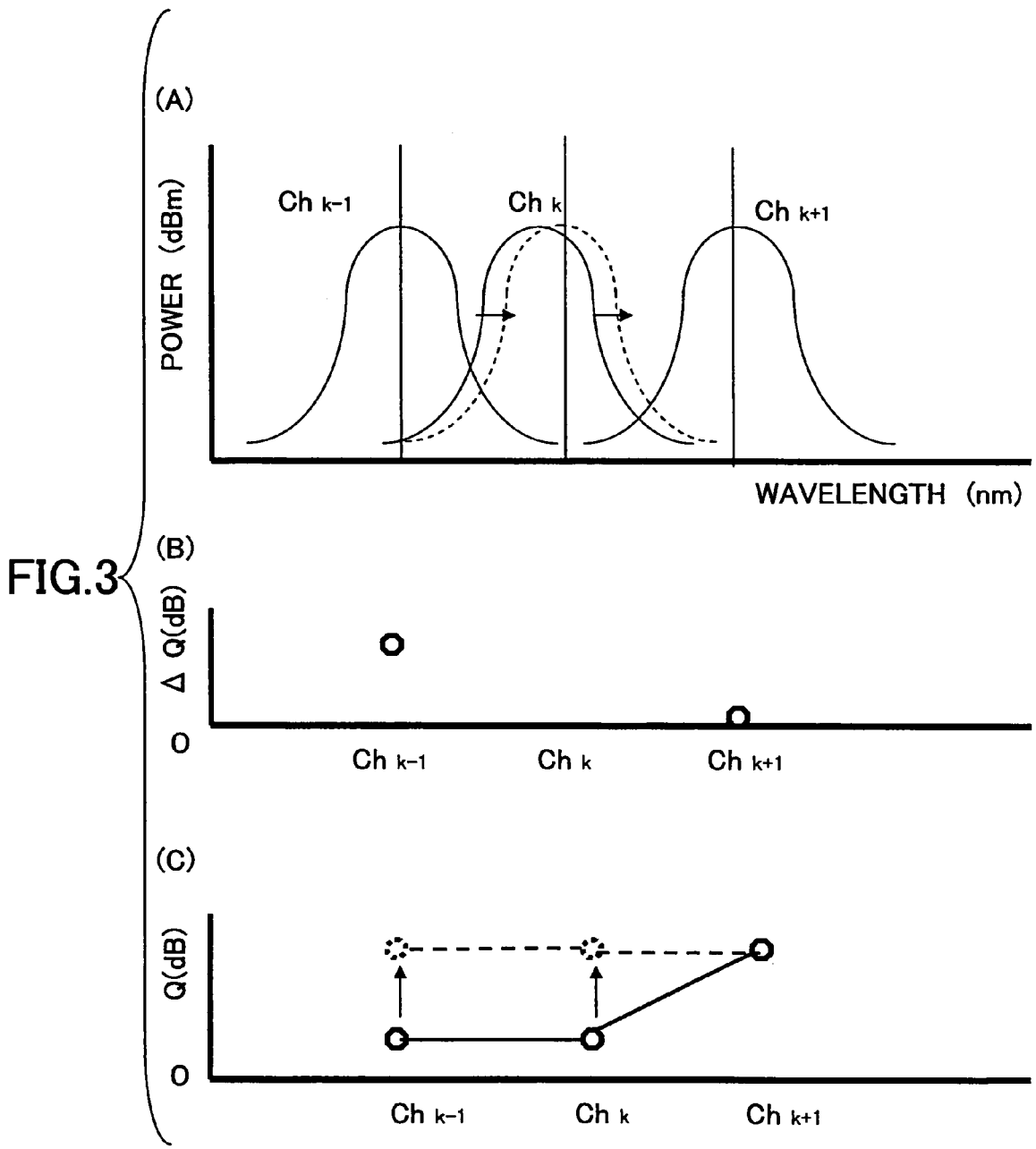
FIG. 3 gives graphs for explaining a method of detecting a wavelength shift according to the embodiment of the present invention.

Crosstalk degradation, which as used herein is the loss of quality Q due to crosstalk, is generated with reference to an adjacent channel. For example, when the wavelength of a certain channel Ch k is displaced to the shorter wavelength side as a solid line shows at FIG. 3(A), an adjacent channel Ch k−1 receives crosstalk degradation. On the contrary, another adjacent channel Ch k+1 on the side of the longer wavelength does not receive crosstalk degradation. In this case, if the optical power of Ch k is reduced, the crosstalk degradation will be lessened, and the Q value which is a value corresponding to BER (Bit Error Rate), which is the code error rate, will improve at the channel Ch k−1. FIG. 3(B) shows Q value changes $\Delta Q$ when the optical power of Ch k is reduced by 1 dB, which indicates that the Q value of the Ch k−1, the crosstalk of which is great, is improved by the reduction in power.

As described above, for example, if the Q value of the adjacent channel Ch k−1 improves with the reduction of the optical power of Ch k, it turns out that the adjacent channel k−1 is receiving crosstalk degradation due to the wavelength shift of Ch k. Then, by moving the wavelength spectrum of the certain channel. (Ch k, here) in a direction that is opposite to (away from) a channel (Ch k−1, here), the Q value of which is improved by reducing the optical power of the certain channel (Ch k, here), as shown by a dashed line in FIG. 3(A), crosstalk degradation of Ch k−1 can be suppressed. By moving the center wavelength of Ch k to the side of Ch k+1, the Q value of each channel becomes as shown by a dashed line, changed from the solid line, in FIG. 3(C).

Changing a wavelength for compensating for the wavelength shift is carried out by the monitoring and controlling unit 50 giving an offset to a setting temperature provided to a temperature control circuit of a laser diode of each of the electric-to-optical conversion units $32_1$ through $32_n$.

The number of error correction bits of a code error correction circuit included in the received data processing units $46_1$ through $46_n$ of the optical receiving unit 40 (FEC) can be obtained based on the Q value. Further, if the Q value is high enough to obtain error free reception (e.g., BER being $1\times10^{-15}$ or less) by correcting errors, wavelength adjustment can be performed without causing an error.

<Need for Shortening Measuring Time>

The wavelength adjustment, i.e., changing the wavelength, should be carried out without greatly degrading the Q value, and for this reason, it has to be carried out in small steps, each step adjusting by a small amount such as several pm (pico meters). Further, in the case of a WDM system, dozens of channels have to be adjusted. Accordingly, it is necessary to shorten the Q value measuring time per adjustment. In order to shorten the measuring time, a detecting threshold of an optical-to-electrical conversion unit is shifted from the optimal state such that the Q value, which is a code error rate per unit time, is purposely worsened. In this way, a stable state for Q value measurement is obtained in a short time.

For example, the maximum of the Q value that can be stably measured in 100 ms is 14.3 dB (equivalent to BER=$1\times10^{-7}$); the minimum of the Q value is set at 13.54 dB (equivalent to BER=$1\times10^{-6}$), which is obtained by adding a margin of 2 to 3 dB to the Q value of, for example, 10.35 dB (equivalent to BER=$5\times10^{-5}$) that can be made error free by the code error correction circuit.

Figure 4:
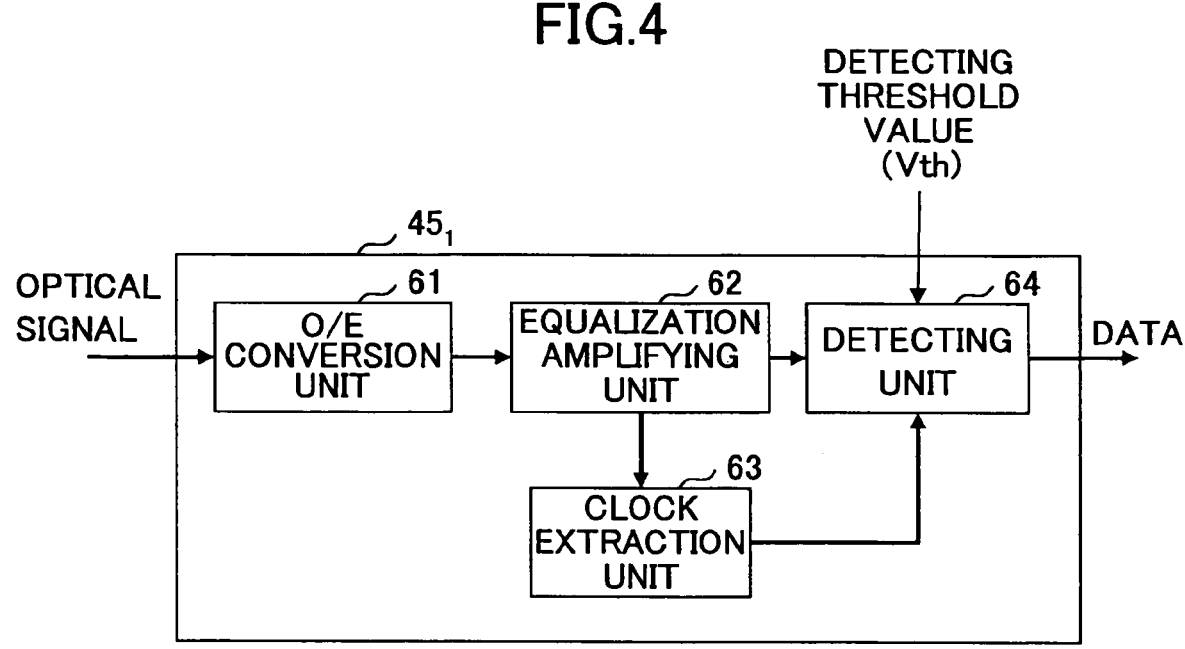
FIG. 4 is a block diagram of an optical-to-electrical conversion unit according to the embodiment of the present invention.

FIG. 4 is a block diagram of the optical-to-electrical conversion unit $45_1$ according to the embodiment of the present invention, other optical-to-electrical conversion units $45_2$ through $45_n$ having the same structure. As shown, the optical-to-electric conversion unit $45_1$ includes an O/E conversion unit 61 for converting the optical signal supplied into an electric signal, the converted signal serving as a received signal, an equalization amplification unit 62 for receiving the converted signal, and for performing equalization amplification of the received signal, a clock extraction unit 63 for extracting a clock component contained in the received signal, and a detecting unit 64 for receiving the clock component, and for detecting the received signal as follows.

The detecting unit 64 receives a detecting threshold value from the monitoring and controlling unit 50, samples the received signal provided by the equalization amplification unit 62 at the timing of the clock supplied by the clock extraction unit 63, compares the sampled signal with the detecting threshold value, and determines a binary value, one of "1" and "0".

The detecting threshold value supplied by the monitoring and controlling unit 50 to the optical-to-electrical conversion units $45_1$ through $45_n$ is gradually changed, the Q value change is monitored by the monitoring and controlling unit 50, and the Q value is degraded.

Here, instead of changing the detecting threshold value of the receiver so that the code error rate is increased, the Q value may be degraded by using variable distribution compensating units (Virtually Imaged Phased Array) in place of the distribution compensating units $34_1$ through $34_n$, or $44_1$ through $44_n$, wherein the amount of distribution compensation is changed from the optimal state. Further, the Q value may be degraded by reducing the optical power by the variable attenuators $35_1$ through $35_n$, or $43_1$ through $43_n$.

<Flowchart of Main Signal Wavelength Control Process>

Figure 5:
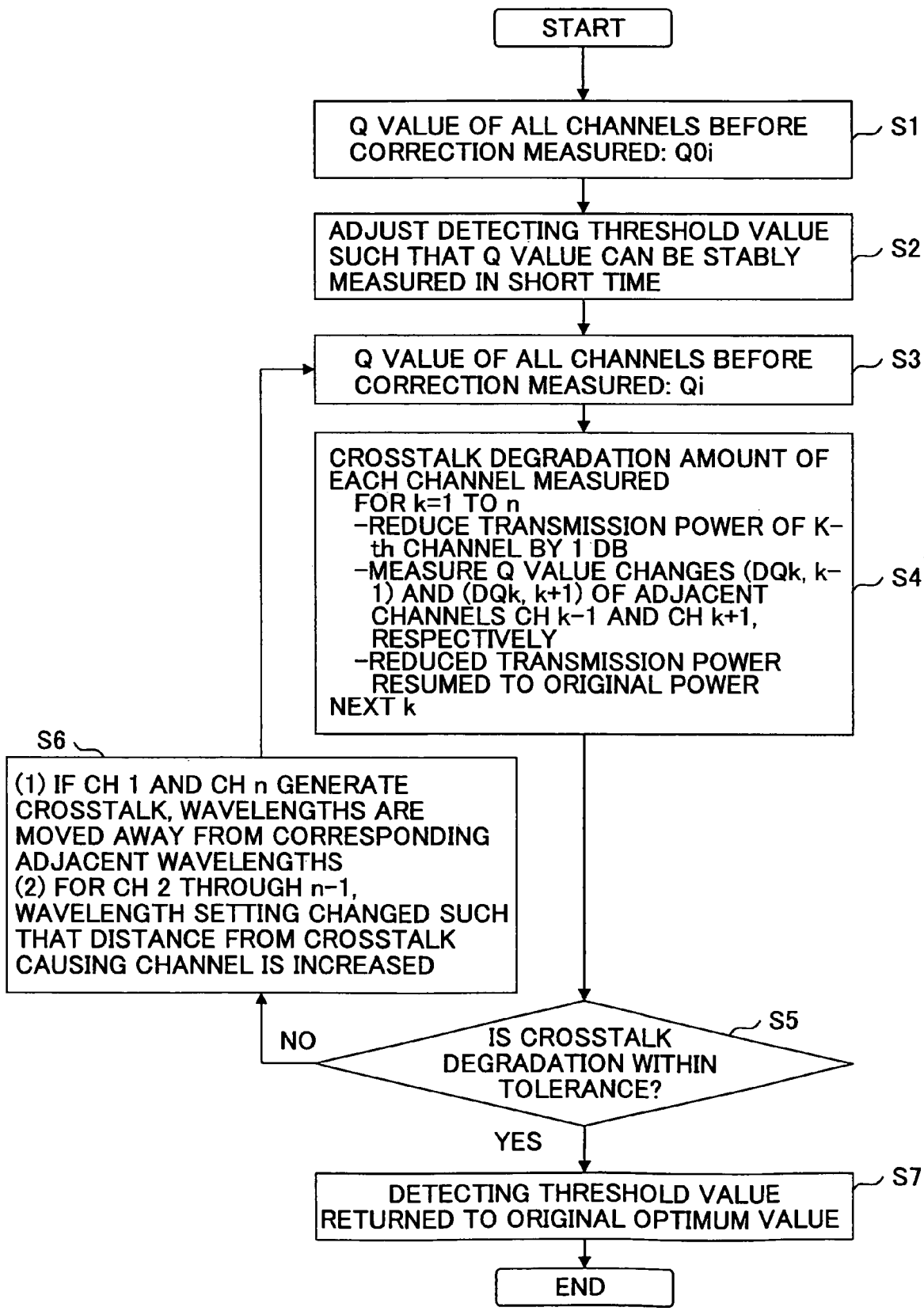
FIG. 5 is a flowchart of a main signal wavelength control process carried out by a monitoring and controlling circuit according to the embodiment of the present invention.

FIG. 5 is a flowchart of a main signal wavelength control process carried out by the monitoring and controlling unit 50. With reference to FIG. 5, Q values of all channels (QOi) before correction are first measured at Step S1. Next, at Step S2, the detecting threshold value supplied to the optical-to-electrical conversion units $45_1$ through $45_n$ is adjusted such that the Q values can be stably measured in a short time.

The Q values of all channels (Qi) before correction are measured at Step S3. Next, an amount of crosstalk degradation of each channel is measured at Step S4. Here, for each k (1 through n), the transmitting power of a channel Ch k is reduced by 1 dB, changes of Q ($\Delta Q$), that is, the amount of crosstalk degradation, of the adjacent channels Ch k−1 and Ch k+1 are measured, namely, [$\Delta Qk, k-1$], and [$\Delta Qk, k+1$], respectively. Then, the transmitting power of Ch k is returned to the original power level.

FIG. 6 gives an example of channels, transmitting power of which is reduced by 1 dB; corresponding adjacent channels, Q values of which are measured; and amounts of crosstalk degradation of the adjacent channels. In the following, [ΔQk, k+1], e.g., represents an amount of improvement of the Q value (namely, the amount of reduction of crosstalk degradation) of the channel Ch k+1 when the transmitting power of the channel Ch k is reduced by 1 dB. If [ΔQk, k+1] or [ΔQk+1, k] is greater than [ΔQk+1, k+2] or [ΔQk+2, k+1], it is determined that the channel k+1 is placed closer to the channel k. Accordingly, the wavelength of the channel k+1 is moved (changed to be) farther from the wavelength of channel k. In this way, wavelength control is performed, reducing the crosstalk degradation.

In the case that [ΔQk, k+1] or [ΔQk+1, k], and [ΔQk+1, k+2] or [ΔQk+2, k+1] are of almost the same magnitude, both of the channels k−1 and k+1 cause crosstalk degradation in the channel k. Then, the wavelength of the channel k is adjusted. In this way, a highly precise wavelength adjustment is carried out.

At Step S5, it is determined whether all the measured amounts of crosstalk degradation are within predetermined tolerance. If at least one of the amounts of crosstalk degradation exceeds the tolerance, the process progresses to Step S6; if, otherwise, all the amounts of crosstalk degradation are within tolerance, the process progresses to Step S7.

When channel 1 or channel n generates crosstalk in corresponding adjacent channels (that is, channel 2 or channel n−1, respectively), the wavelength of channel 1 or channel n is moved in the direction that departs from the wavelength of channel 2 or the wavelength of channel n−1, respectively, for compensating for the wavelength shift at Step S6. Further, when channels 2 through n−1 generate crosstalk in corresponding adjacent channels, the wavelengths of channels 2 through n−1 are moved in the direction that departs from the wavelengths of the corresponding channels, the amounts of crosstalk degradation of which exceed the tolerance, for compensating for the wavelength shift. Then, the process returns to Step S3, and Steps S3 through S5 are repeated.

Further, at Step S7, the detecting threshold value supplied to the optical-to-electrical conversion units $45_1$ through $45_n$ is returned to the optimal value, and the process is ended.

Here, although the measurement and evaluation are carried out with the power of each of the channels 1 through n being reduced according to the embodiment, since [ΔQk, k+1]≈[ΔQk+1, k], the measurement and evaluation may be carried out on every other channel from channel 2 through channel n.

<Flowchart of Threshold Level Adjustment Process>

Figure 7:
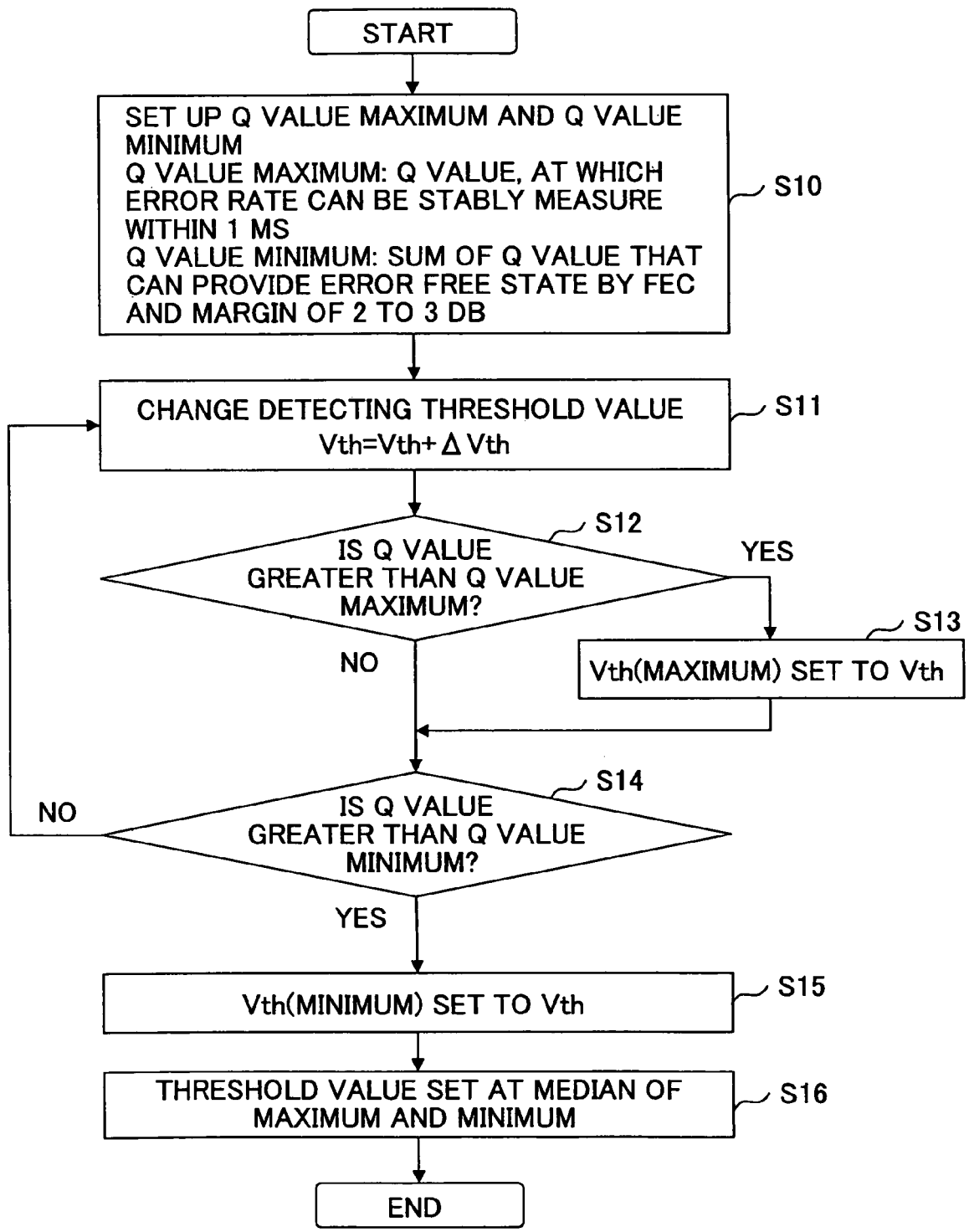
FIG. 7 is a flowchart of a threshold level adjustment process according to the embodiment of the present invention.

FIG. 7 is a flowchart of a threshold level adjustment process of shortening the adjustment time taken by the monitoring and controlling unit 50 at Step S2. This process is performed for all the channels. At Step S10, the maximum Q value and the minimum Q value are set up. The maximum Q value is the largest Q value, an error rate corresponding to which can be stably measured within a time interval, for example, 1 ms; and the minimum Q value is the smallest Q value, an error rate corresponding to which can be improved to an error free state by the code error correction circuit, with a margin of, e.g., 2 through 3 dB.

At Step S11, the detecting threshold value Vth is increased by ΔVth. Then, at Step S12, it is determined whether a measured Q value is greater than the maximum Q value. If the Q value is determined to be greater than the maximum Q value, the Q value is set equal to Vth (maximum) at Step S13.

Next, it is determined whether the Q value is greater than the minimum Q value at Step S14. If the Q value is not greater than the minimum Q value, the process returns to Step S11. If the Q value is determined to be greater than the minimum Q value, the Q value is set equal to Vth (minimum) at Step S15. Then, the detecting threshold value Vth is set equal to a middle value between Vth (maximum) and Vth (minimum) at Step S16, and this process is ended.

<Flowchart of Amount Adjustment Process of Distribution Compensation>

Figure 8:
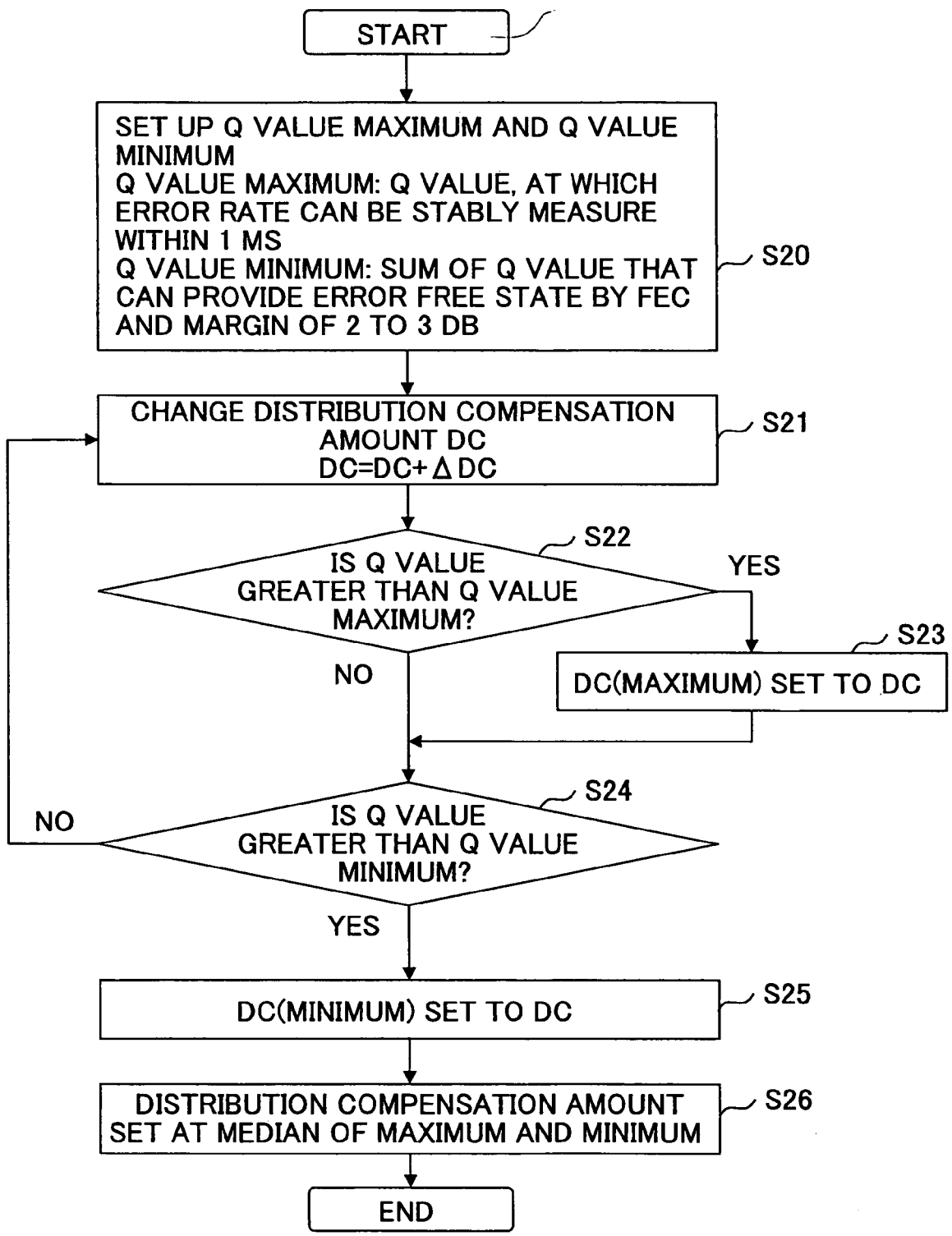
FIG. 8 is a flowchart of a process of adjusting a compensation amount of distribution according to the embodiment of the present invention.

FIG. 8 is a flowchart of a distribution compensation amount adjustment process of shortening the adjustment time taken by the monitoring and controlling unit 50 at Step S2. This process is performed for all the channels. The maximum Q value and the minimum Q value are set up at Step S20. The maximum Q value is a Q value, an error rate corresponding to which can be stably measured within, for example, 1 ms. The minimum of Q value is a Q value, an error rate corresponding to which can be improved to an error free state by the code error correction circuit, with a margin of, e.g., 2 through 3 dB.

At Step S21, the amount DC of distribution compensation is increased by ΔDC. Then, at Step S22, it is determined whether the Q value is greater than the maximum Q value. If the Q value is greater than the maximum Q value, the amount DC of distribution compensation at that time is set equal to DC (maximum) at Step S23.

Next, at Step S24, it is determined whether the Q value is greater than the minimum Q value. If the Q value is not greater than the minimum Q value, the process returns to Step S21. If the Q value is greater than the minimum Q value, the amount DC of distribution compensation at that time is set equal to DC (minimum) at Step S25. Then, the amount DC of distribution compensation is set equal to a middle value between DC (maximum) and DC (minimum) at Step S26, and this process is ended.

<Flowchart of Optical Power Level Adjustment Process>

Figure 9:
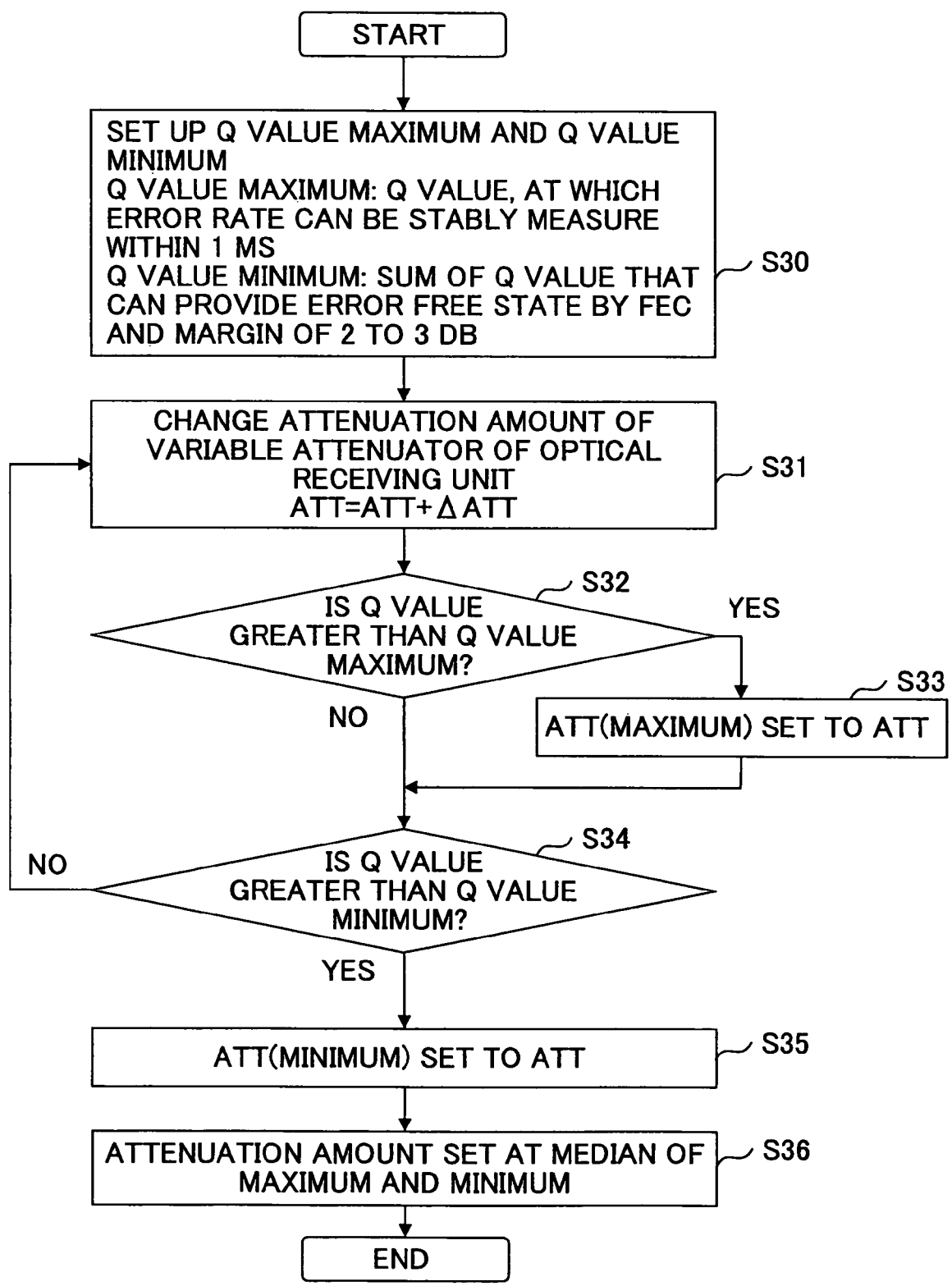
FIG. 9 is a flowchart of a process of performing an optical power level adjustment according to the embodiment of the present invention.

FIG. 9 is a flowchart of an optical power level adjustment process for shortening adjustment time taken by the monitoring and controlling unit 50 at Step S2. This process is performed for all the channels. The maximum Q value and the minimum Q value are set up at Step S30. The maximum Q value is a Q value, an error rate corresponding to which can be stably measured, for example, within 1 ms. The minimum of Q value is a Q value, an error rate corresponding to which can be improved to an error free state by the code error correction circuit, with a margin of, e.g., 2 through 3 dB.

The magnitude of attenuation ATT is increased by ΔATT at Step S31. Then, at Step S32, it is determined whether the Q value is greater than the maximum Q value. If the Q value is greater than the maximum Q value, the magnitude of attenuation ATT at that time is set equal to ATT (maximum) at Step S33.

Next, it is determined whether the Q value is greater than the minimum Q value at Step S34. If the Q value is not greater than the minimum Q value, the process returns to Step S31. If the Q value is greater than the minimum Q value, the magnitude of attenuation ATT at that time is set equal to ATT (minimum) at Step S35. Then, the magnitude of attenuation ATT is set equal to a middle value between ATT (maximum) and ATT (minimum) at Step S36, and this process is ended.

<Specific Example of Application of the Present Invention>

Figure 10:
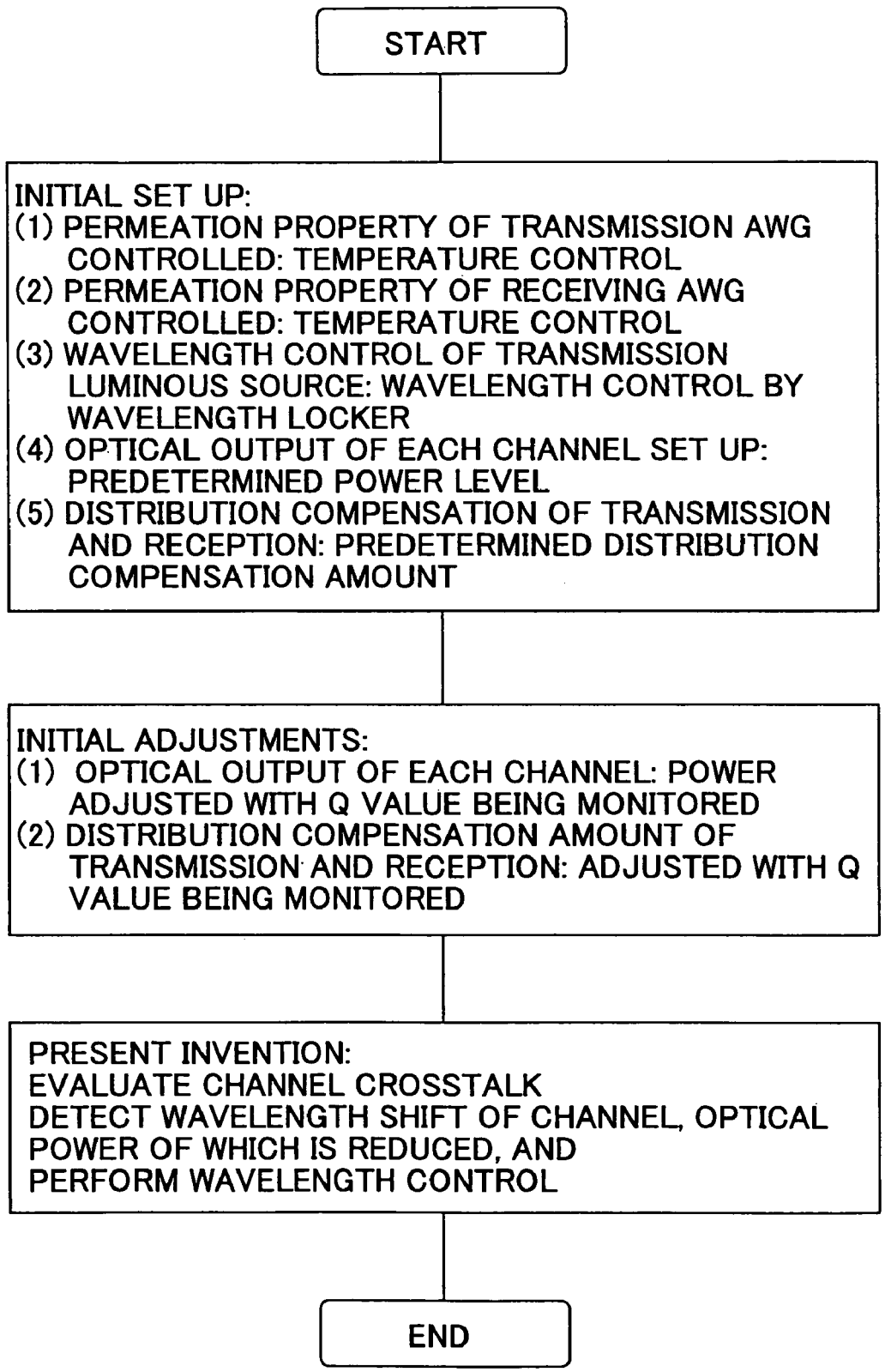
FIG. 10 is a flowchart for explaining a specific example to which the present invention is applied.

Next, a specific example of application of the present invention is described. When the power is turned on, a starting signal is generated, and the following items are carried out as shown in FIG. 10, namely:

a pre-emphasis, whereby optical power level of each channel is set up, a distribution setup, a signal wavelength setup, a temperature control of transmitting AWG,
a temperature control of receiving AWG,
a temperature control of the transmitting luminous source, and
an optical output control of the transmitting luminous source.

Here, temperature control between transmitting signals is performed by the wavelength locker.

Then, Q value is monitored, and the optical power level adjustment of each channel and the distribution compensation amount adjustment of transmitting and receiving are performed so that the optimal Q value is obtained.

After the adjustments are finished, the channel crosstalk is evaluated, the shift of the wavelength of a channel, the optical power of which is reduced is detected, and the wavelength control is carried out.

In addition, Step S4 corresponds to the optical power reducing unit, Step S5 corresponds to the wavelength shift detecting unit, Step S6 corresponds to the wavelength shift compensating unit, and Step S2 corresponds to the code error rate increasing unit.

Further, the present invention is not limited to these embodiments, but variations and modifications may be made without departing from the scope of the present invention.

The present application is based on Japanese Priority Application No. 2005-287534 filed on Sep. 30, 2005 with the Japanese Patent Office, the entire contents of which are hereby incorporated by reference.

What is claimed is:

1. An optical wavelength controlling method performed by an optical wavelength controlling system of an optical wavelength division multiplexing transmission system wherein a plurality of wavelengths of channels which wavelengths are multiplexed and transmitted by an optical transmitting unit, and the multiplexed wavelengths are divided into the wavelengths of the channels by an optical receiving unit, the optical wavelength controlling method comprising:
   reducing, by an optical power reducing unit of the optical wavelength controlling system, optical power of one of the wavelengths of the channels in the optical transmitting unit, which one is the wavelength of a target channel, and transmitting the wavelengths;
   evaluating, by a wavelength shift detecting unit of the optical wavelength controlling system, channel crosstalk in the optical receiving unit based on a code error rate of a channel adjacent to the target channel, and detecting a shift of the wavelength of the target channel in the optical transmitting unit; and
   compensating for the shift of the wavelength of the target channel in the optical transmitting unit, by a wavelength shift compensation unit of the optical wavelength controlling system, based on a result of the evaluation of the channel crosstalk.

2. The optical wavelength controlling method as claimed in claim 1, wherein a code error rate of each channel per unit time is increased by the optical receiving unit.

3. An optical wavelength controlling system of en optical wavelength division multiplexing transmission system wherein a plurality of wavelengths of channels which wavelengths are multiplexed and transmitted by an optical transmitting unit, and the multiplexed wavelengths are divided into the wavelengths of the channels by an optical receiving unit, the optical wavelength controlling system comprising:
   an optical power reducing unit configured to reduce optical power of one of the wavelengths of the channels in the optical transmitting unit, which one is the wavelength of a target channel, and transmit the wavelengths;
   a wavelength shift detecting unit configured to evaluate channel crosstalk in the optical receiving unit based on a code error rate of a channel adjacent to the target channel, and detect a shift of the wavelength of the target channel in the optical transmitting unit; and
   a wavelength shift compensation unit configured to compensate for the shift of the wavelength of the target channel in the optical transmitting unit based on a result of the evaluation of the channel crosstalk.

4. The optical wavelength division multiplexing transmission system as claimed in claim 3, further comprising:
   a code error rate increasing unit provided in the optical receiving unit for increasing the code error rate of each channel per unit time.

5. The optical wavelength division multiplexing transmission system as claimed in claim 4, wherein the code error rate increasing unit increases the code error rate by changing a detecting threshold value that is set up for carrying out an optical-to-electric conversion of and detecting the wavelengths of the channels divided by the optical receiving unit.

6. The optical wavelength division multiplexing transmission system as claimed in claim 4, wherein the code error rate increasing unit increases the code error rate by changing a distribution compensation amount of a distribution compensating unit of one of the optical transmitting unit and the optical receiving unit.

7. The optical wavelength division multiplexing transmission system as claimed in claim 4, wherein the code error rate increasing unit increases the code error rate by reducing optical power of the wavelengths of the channels at one of the optical transmitting unit and the optical receiving unit.

* * * * *

UNITED STATES PATENT AND TRADEMARK OFFICE
CERTIFICATE OF CORRECTION

PATENT NO. : 7,725,033 B2
APPLICATION NO. : 11/319231
DATED : May 25, 2010
INVENTOR(S) : Hiroshi Nakamoto It is certified that error appears in the above-identified patent and that said Letters Patent is hereby corrected as shown below:

Column 10, Line 7 delete "en" and insert --an--.

Signed and Sealed this
Fifth Day of April, 2011

David J. Kappos
*Director of the United States Patent and Trademark Office*